(12) United States Patent
Sori et al.

(10) Patent No.: US 11,168,745 B2
(45) Date of Patent: Nov. 9, 2021

(54) FRICTION ENGAGING DEVICE

(71) Applicant: Mazda Motor Corporation, Hiroshima (JP)

(72) Inventors: Tsukasa Sori, Hiroshima (JP); Hirofumi Ebisumoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/809,992

(22) Filed: Mar. 5, 2020

(65) Prior Publication Data

US 2020/0378451 A1 Dec. 3, 2020

(30) Foreign Application Priority Data

May 28, 2019 (JP) .............................. JP2019-099622

(51) Int. Cl.
| | |
|---|---|
| *F16D 25/0638* | (2006.01) |
| *F16H 63/30* | (2006.01) |
| *F16D 13/42* | (2006.01) |
| *F16D 25/02* | (2006.01) |
| *F16D 13/68* | (2006.01) |
| *F16D 13/69* | (2006.01) |

(52) U.S. Cl.
CPC ......... *F16D 25/0638* (2013.01); *F16D 13/42* (2013.01); *F16D 13/68* (2013.01); *F16D 13/69* (2013.01); *F16D 25/02* (2013.01); *F16H 63/3026* (2013.01)

(58) Field of Classification Search
CPC .... F16D 25/0638; F16D 25/02; F16D 25/123; F16D 25/12; F16D 13/69; F16D 13/42; F16D 13/52; F16D 13/68; F16D 13/70; F16D 13/683; F16D 2300/12; F16H 63/3026
See application file for complete search history.

(56) References Cited

U.S. PATENT DOCUMENTS 2,935,169 A * 5/1960 Mills ....................... F16D 13/52
192/85.4
3,537,556 A 11/1970 Pfeffer et al.
(Continued)

FOREIGN PATENT DOCUMENTS

| JP | H05187458 A | 7/1993 |
|---|---|---|
| JP | 200313996 A | 1/2003 |
| WO | 2015075133 A2 | 5/2015 |

*Primary Examiner* — David R Morris
*Assistant Examiner* — Lori Wu
(74) *Attorney, Agent, or Firm* — Alleman Hall Creasman & Tuttle LLP (57) ABSTRACT

The present disclosure provides a wet friction engaging device. The device includes: a plate group engaged with two connecting members and including two groups of friction plates housed in a plate housing chamber and alternately arranged in an axial direction with surfaces facing each other; and a piston configured to apply a pressing force to the plate group. The plate group is switched between an engaged state in which the friction plates are in close contact with each other, and a disengaged state in which the friction plates are separable from each other. One of end plates at respective ends of the plate group is a movable end plate movable in the axial direction, and the other is a stationary end plate immovable in the axial direction. The movable end plate is biased by a spring.

9 Claims, 10 Drawing Sheets

(56) References Cited

U.S. PATENT DOCUMENTS

| | | | |
|---|---|---|---|
| 3,744,605 A | 7/1973 | Piret | |
| 4,548,306 A * | 10/1985 | Hartz | F16D 13/52 |
| | | | 192/70.28 |
| 4,802,564 A * | 2/1989 | Stodt | F16D 25/12 |
| | | | 192/70.28 |
| 4,828,089 A | 5/1989 | Collins et al. | |
| 5,383,544 A | 1/1995 | Patel | |
| 5,975,267 A | 11/1999 | Takakura et al. | |
| 2005/0000776 A1 | 1/2005 | Merkel et al. | |
| 2018/0238398 A1 | 8/2018 | Rippelmeyer et al. | |

* cited by examiner

FRICTION ENGAGING DEVICE

CROSS-REFERENCE TO RELATED APPLICATION

This application claims priority to Japanese Patent Application No. 2019-099622 filed on May 28, 2019, the entire disclosure of which is incorporated by reference herein.

BACKGROUND

The present disclosure relates to a wet friction engaging device being a clutch or a brake, for example, included in a transmission, for example.

In general, friction engaging devices of this type include friction plates being drive plates or driven plates. The drive and driven plates are connected to a hub and a drum, for example, and arranged alternately along the thickness of the plates to be slidable with each other. Among these friction plates, lubricating oil (ATF) is supplied during the use of the friction engaging device (what is called a "wet type").

These friction plates are pressed into close contact with each other to connect the hub and the drum to each other (i.e., an engaged state). The pressing force is released to separate these friction plates from each other, whereby the hub and the drum operate independently (i.e., a disengaged state).

In a friction engaging device of this type, adjacent friction plates may not be separated properly even in the disengaged state to cause frictional resistance between the friction plates (i.e., a drag phenomenon). Since this frictional resistance causes an unnecessary torque (e.g., a drag torque), various measures have been considered.

For example, Japanese Unexamined Patent Publication No. H05-187458 discloses a clutch device including ring wave springs between adjacent friction plates so that the elastic force of the springs provides wider gaps between the friction plates in a disengaged state.

Japanese Unexamined Patent Publication No. 2003-13996 discloses a friction engaging device including spring clips attached to friction plates so that the elastic force of the clips applies a biasing force to separate the friction plates from each other.

SUMMARY

With the use of the techniques according to Japanese Unexamined Patent Publication Nos. H05-187458 and 2003-13996, the adjacent friction plates are stably separated from each other in the disengaged state.

There is a need, however, for these techniques to prepare a large number of the wave springs or spring clips and to properly assemble these components one by one in proper positions in the gaps between the friction plates. This increases the number of the components, the cost for the members, the number of assembling steps, and the burden of the assembling work. In addition, even a single defective component may hinder proper effects.

To address the problem, after detailed studies of the drag phenomenon, the present inventors found that the drag phenomenon can be effectively reduced with a very simple structure based on the mechanism of the phenomenon.

It is a principal objective of the present disclosure to achieve a friction engaging device capable of effectively reducing a drag phenomenon even with a simple structure.

The present disclosure relates to a wet friction engaging device that switches the transmission of power to be output to a rotary shaft.

The friction engaging device includes: two connecting members, each having a surface facing a surface of the other connecting member in a radial direction with a plate housing chamber interposed therebetween, the chamber being supplied with lubricating oil; a plate group engaged with the connecting members and including two groups of friction plates housed in the plate housing chamber and alternately arranged in an axial direction with surfaces facing each other; and a piston moving forward and rearward from one side in an axial direction toward the plate group to apply a pressing force to the plate group.

The plate group is switched between an engaged state in which the friction plates are in close contact with each other upon application of the pressing force, and a disengaged state in which the friction plates are separable from each other upon release of the pressing force. One of end plates at respective ends of the plate group is a movable end plate movable in the axial direction, and the other is a stationary end plate immovable in the axial direction. The movable end plate is biased by a basing member to be separated from the stationary end plate in the axial direction.

That is, according to this friction engaging device, the plate housing chamber supplied with the lubricating oil houses the friction plates of the two groups arranged alternately. The plate group is switched between the engaged and disengaged states by the action of the piston.

Once the plate group is switched to the disengaged state, the friction plates constituting the plate group are freely movable in the axial direction. The plates are usually attracted to each other by lubricating oil supplied among the plates, which causes a drag phenomenon.

To address the problem, the present inventors found the following, although the detail will be described later. The two end plates at respective ends of the plate group are spaced at a larger distance from each other to restrict the axial movement. Only with this configuration, the pressure balance naturally arranges the friction plates at a substantially equal interval.

Based on the finding, in this friction engaging device, one of the end plates at the respective ends of the plate group is the movable end plate movable in the axial direction, and the other is the stationary end plate immovable in the axial direction. The movable end plate is biased by the biasing member to be separated from the stationary end plate in the axial direction.

With this configuration, the biasing force of the biasing member keeps the two end plates at the respective ends of the plate group at a larger distance in the disengaged state. Accordingly, this friction engaging device effectively reduces a drag phenomenon even with a simple structure.

The friction engaging device may also be configured as follows. The movable end plate may be the end plate on a side closer to the piston. The stationary end plate may be obtained by stacking a specified regulator plate on and outside the end plate on a side away from the piston, and allowing a first movement regulator at one side of these plates and a second movement regulator at the other side to restrict axial movement. The movable end plate may be biased by a spring, which is the biasing member attached between the movable end plate and the regulator plate, to be separated from the stationary end plate in the axial direction.

In this friction engaging device, the configurations of the movable and stationary end plates are specified. Specifically, the movable end plate is the end plate on the side closer to the piston. The stationary end plate is obtained by stacking the specified regulator plate on and outside the end plate on the side away from the piston and allowing the first movement regulator at one side of these plates and the second movement regulator at the other side to restrict axial movement. The movable end plate is biased by the spring, which is attached between the movable end plate and the regulator plate, to be separated from the stationary end plate in the axial direction.

With this configuration, a high-performance friction engaging device is easily achieved using the existing members.

In the friction engaging device, at least one end of the spring may be fixed to one of the end plates.

The fixing of the end of the spring to the end plate keeps the spring in a proper position even when the end plate moves. This configuration stabilizes thus the operation of the friction engaging device.

In the friction engaging device, at least one end of the spring may be detachably supported by a spring holder located at one of the end plates.

The fixing of the end of the spring to the end plate requires the processing of fixing the spring to the end plate and the work of assembling the end plate with the spring fixed thereto. That is, the manufacturing process becomes complicated. By contrast, since the spring is, due to its structure, compressed to be assembled, the spring holder on the end plate stably supports the end of the spring without fixing the end of the spring. This simplifies the manufacturing process.

In the friction engaging device, the spring may include a plurality of springs in three or more positions at a predetermined interval in a circumferential direction.

With this configuration, the biasing force of the springs acts on the end plates, for example, in a well-balanced manner to reduce inclination of the end plates. This provides gaps between the adjacent plate surfaces at a stable interval.

In the friction engaging device, the springs may be located outside outer circumferential edges of the friction plates arranged between the end plates.

This configuration reduces the overall size of the friction engaging device. Not only well balanced in the circumferential direction but also in a position largely distant outward from the centers of the friction plates in the radial direction, the biasing force of the springs acts effectively to achieve a more stable operation of the friction engaging device.

The present disclosure effectively reduces a drag phenomenon that may occur in a disengaged state with a simple structure to achieve a friction engaging device with a high fuel efficiency.

DETAILED DESCRIPTION

Now, embodiments of the present disclosure will be described in detail with reference to the drawings. Note that the following description of the embodiments is merely an example in nature, and is not intended to limit the scope, applications, or use of the present disclosure.

In the explanation, an output shaft 3, which will described later, extends in an "axial direction," the radius or diameter about the center of the output shaft 3 extends in a "radial direction," and a circumference about the center of the output shaft 3 extends in a "circumferential direction." In the axial direction, power is input through an "input side" to a transmission 1, which will described later, and output through an "output side" from the transmission 1.

Transmission

Figure 1:
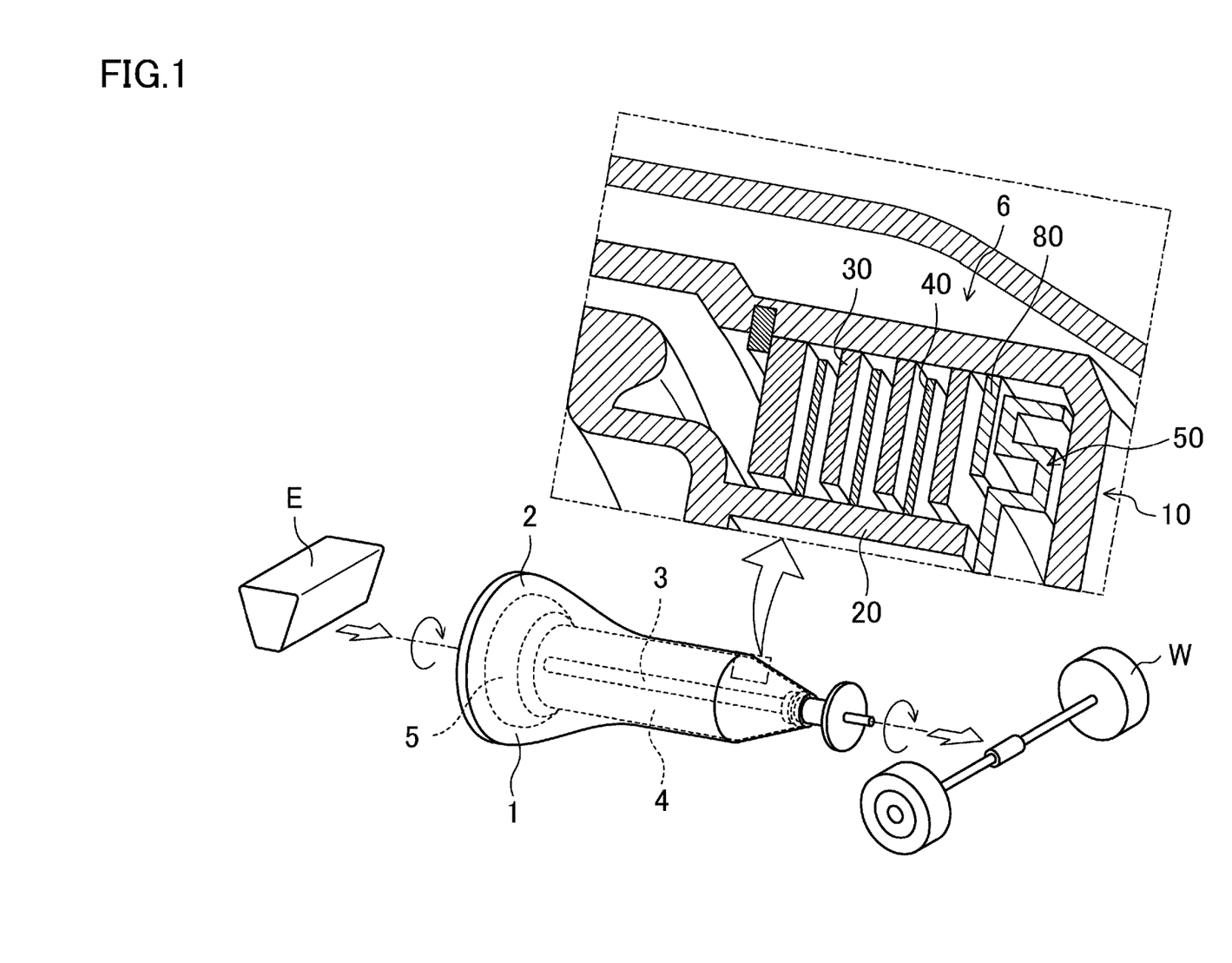
FIG. 1 is a schematic view of a transmission suitable for the present disclosure and associated devices. Enlarged is a schematic cross-sectional view of a part of a friction engaging device.

FIG. 1 illustrates the exemplary transmission (an automatic transmission) 1 suitable for the present disclosure. The transmission 1 is mounted on a motor vehicle. The transmission 1 is interposed between a driving source E, such as an engine and a motor, and wheels W to accelerate or decelerate the rotational power output from the driving source E and output the rotational power to the wheels.

The exemplary transmission 1 is a multistage automatic transmission (what is called an "AT"). The application of the present disclosure is not limited to the transmission 1. The present disclosure is applicable to anything that includes a wet friction engaging device.

The transmission 1 includes a housing 2, the output shaft (a rotary shaft) 3, a transmission device 4, and an intermittent device 5, for example. The housing 2 constitutes the outline of the transmission 1, houses the intermittent device 5 and the transmission device 4, and rotatably supports the output shaft 3.

The intermittent device (what is called a "torque converter") 5 is connected to the driving source E, and inputs the rotational power output from the driving source E to the transmission 1 as necessary. The transmission device 4 is located around the output shaft 3 and interposed between the intermittent device 5 and the output shaft 3. The transmission device 4 changes the speed of the rotational power input from the intermittent device 5 and transmits the power to the output shaft 3. The rotational power output from the transmission 1 through the output shaft 3 is transmitted to the wheels W.

The transmission device 4 includes planetary gear mechanisms assembled therein to change the speed of the rotational power to be output. In order to shift these planetary gear mechanisms, the transmission device 4 also includes a clutch or a brake (i.e., a friction engaging device 6) assembled therein. The transmission 1 changes the operation modes of the clutch or the brake to perform switching between forward and rearward movement and change the rotational speed.

Structure of Friction Engaging Device 6

The clutch and the brake have different functions but almost the same structures (hereinafter a brake is referred to as the "friction engaging device 6").

Figure 2:
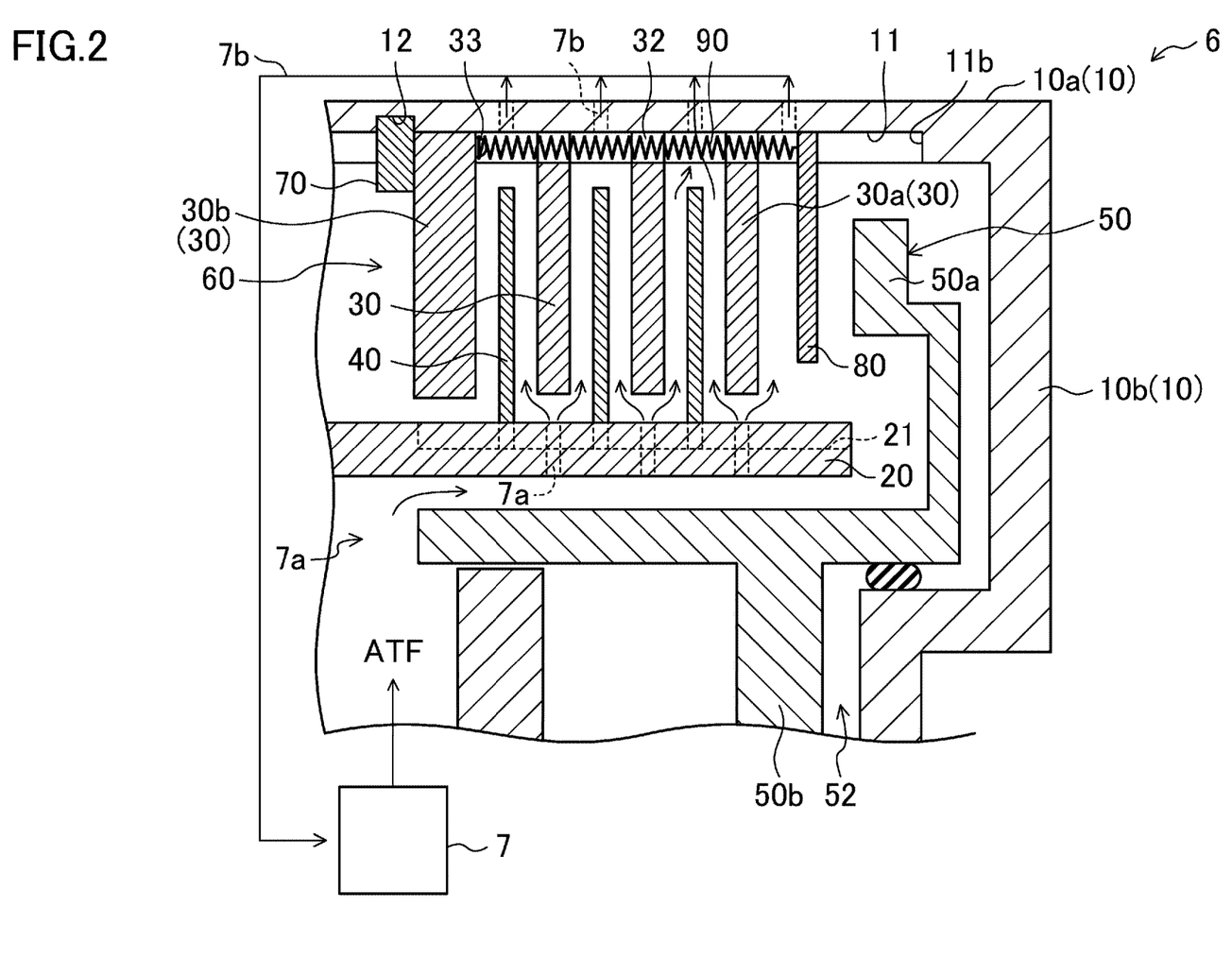
FIG. 2 is a simplified diagram of the friction engaging device corresponding to the enlarged view of FIG. 1.

FIG. 1 includes an enlarged view of a part of the brake 6 included in the transmission device 4. In addition, FIG. 2 is a simplified diagram corresponding to the enlarged view. The illustrated brake 6 includes a drum 10 and a hub 20 as "connecting members." For example, with structurally rotatable drum 10 and hub 20, the brake 6 can also serve as a clutch. The brake 6 includes, in addition to these drum 10 and hub 20, driven plates (i.e., first friction plates) 30, drive plates (i.e., second friction plates) 40, a piston 50, a spring plate (i.e., a regulator plate) 80, and springs (i.e., biasing members) 90, for example.

Drum 10 and Hub 20

Figure 3:
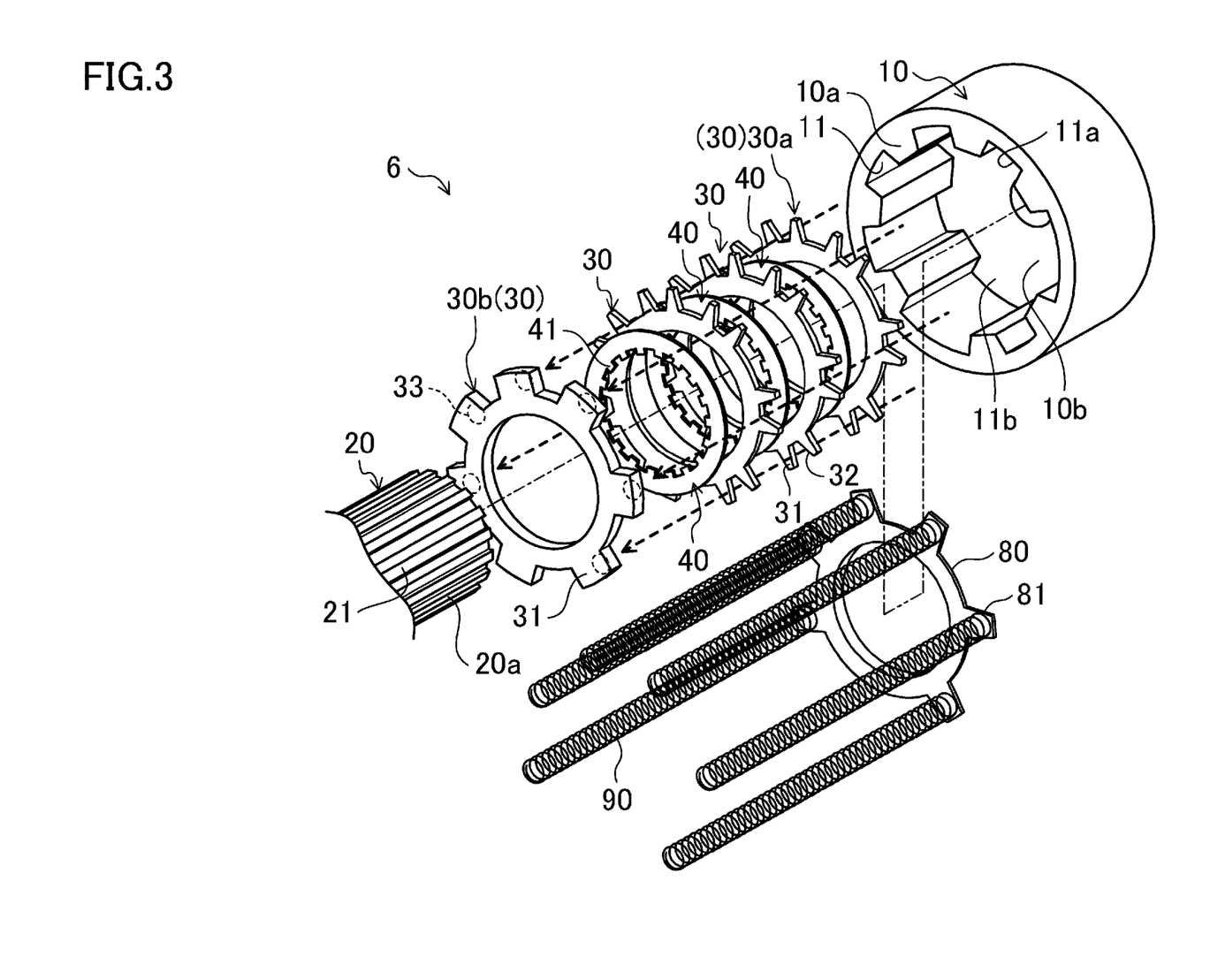
FIG. 3 is a schematic perspective view of an assembly structure of main members of the friction engaging device.

As simply shown in FIG. 3, the drum 10 is a bottomed cylindrical member including a cylindrical circumferential wall 10a, and a disk-like bottom wall 10b with a center penetrated by the output shaft 3. The drum 10 is coaxial with the output shaft 3 inside the housing 2 with its bottom wall 10b facing the output side. The hub 20 is a member including a cylindrical part (i.e., a hub shaft 20a) with a diameter smaller than the drum 10. The hub shaft 20a is housed inside the drum 10 and coaxial with the output shaft 3.

One of the drum 10 and the hub 20 is unrotatably fixed to the housing 2. The other is connected directly or indirectly to the output shaft 3. In this brake 6, the drum 10 is fixed to the housing 2, whereas the hub 20 is connected to the output shaft 3.

The inner circumferential surface of the circumferential wall 10a of the drum 10 and the outer circumferential surface of the hub shaft 20a face each other (i.e., opposed surfaces) in the radial direction. Between these opposed surfaces, a ring-like space (i.e., a plate housing chamber 60) is interposed. In the operation of the transmission 1, this plate housing chamber 60 is supplied with lubricating oil (e.g., automatic transmission fluid (ATF)) that circulates from a lubricating device 7 (shown only in FIG. 2) including an oil reservoir and a hydraulic pump, for example, through an oil inlet passage 7a in the hub shaft 20a and an oil feed passage 7a inside the housing 2 at a constant flow rate (what is called a "wet type").

The ATF supplied to the plate housing chamber 60 returns to the lubricating device 7 through an oil outlet passage 7b in the circumferential wall 10a of the drum 10 and an oil return passage 7b inside the housing 2.

The drum 10 has, in the inner circumferential surface of its circumferential wall 10a, first fitting grooves (i.e., slide recesses) 11 extending in the axial direction. The first fitting grooves 11 are spaced apart from each other in the circumferential direction. In the drum 10 according to the present embodiment, the ends of the first fitting grooves 11 on the input side are open (i.e., open ends 11a). On the other hand, the ends on the output side are closed by the bottom wall 10b (i.e., closed ends 11b).

Similarly, the hub shaft 20a has, in its outer circumferential surface, second fitting grooves 21 extending in the axial direction. The second fitting grooves 21 are also spaced apart from each other in the circumferential direction.

Driven Plates 30 and Drive Plates 40

As shown in FIG. 3, the driven plates 30 are ring plate members made of metal. Each driven plate 30 has first fitting pieces (i.e., slide projections) 31 protruding from its outer circumferential edge to be slidably fitted into the first fitting grooves 11. The first fitting pieces 31 are fitted (what is called "spline fitted") into the first fitting grooves 11 through the open ends 11a, whereby the driven plates 30 are attached to the drum 10 to be slidable in the axial direction.

Each of the driven plates 30, except for the one (i.e., a retainer plate, which will be described later) 30b on the input side, has slots 32 for preventing or reducing contact with the springs 90 in the parts at the outer circumferential edge of the plate to be fitted into the first fitting grooves 11. The slots 32 are formed by recessing the parts at the outer circumferential edges of the driven plates 30 corresponding to the springs 90, which will be described later, from the outside in the radial direction.

As shown in FIG. 3, the drive plates 40 are ring plate members made of metal with a smaller thickness than the driven plates 30. The drive plates 40 have a smaller diameter to allow the springs 90 to pass outside the outer circumferential edges of the drive plates 40 and prevent or reduce the contact with the springs 90.

Each drive plate 40 has second fitting pieces 41 protruding from its inner circumferential edge. The second fitting pieces 41 are fitted (i.e., "spline fitted") into the second fitting grooves 21, whereby the drive plates 40 are attached to the hub 20 to be slidable in the axial direction.

The group of the driven plates 30 and the group of the drive plates 40 are housed in the plate housing chamber 60 and alternately arranged in the axial direction with their surfaces facing each other. These friction plates of these two groups are collectively referred to as a "plate group."

In this brake 6, one of the driven plates 30 is located at each end of the plate group in the axial direction. The driven plate 30 at the end on the output side is also referred to as an "output-side end plate 30a," whereas the driven plate 30 at the end on the input side is also referred to as an "input-side end plate 30b." In the brake 6 according to the present embodiment, the input-side end plate 30b (also referred to as the retainer plate 30b) has a larger thickness than the other driven plates 30.

In addition, the retainer plate 30b is in a different shape from the other driven plates 30. In this brake 6, as described above, the retainer plate 30b includes first fitting pieces 31 without slots 32. These first fitting pieces 31 have dome-like projections (i.e., spring holders 33), which detachably support the ends of the springs 90, in the positions corresponding to the springs 90.

Spring Plate 80 and Springs 90

As shown in FIG. 3, the spring plate 80 is a ring member. The spring plate 80 has (six in the figure) protrusions 81 protruding outward from its outer circumferential edge in the radial direction. The protrusions 81 are spaced apart from each other in the circumferential direction to overlap the first fitting grooves 11 of the drum 10 in the axial direction. The spring plate 80 is adjacent to the end of the plate group on the output side.

The springs 90 are coil springs placed in the brake 6. One ends of the springs 90 are joined to one surfaces of the protrusions 81 by welding or caulking, for example. Accordingly, the springs 90 are fixed to extend substantially perpendicularly to the spring plate 80.

The spring plate 80 is attached closer to the output side than the plate group is, that is, deepest in the drum 10, with the springs 90 extending to the input side, that is, to the open end of the drum 10. After that, the plate group is attached. The retainer plate 30b is attached last to the drum 10 with the spring holders 33 facing the output side.

The springs 90 pass through the slots 32 of the drive plates 40 as indicated by the broken arrows in FIG. 3, and are elastically deformed and compressed in the axial direction to be placed in the plate housing chamber 60. Accordingly, the projecting ends of the springs 90 are detachably supported by the spring holders 33.

The drum 10 has, near the open ends 11*a* of the first fitting grooves 11, a ring groove 12 extending in the circumferential direction. Into the ring groove 12, an elastic snap ring 70 in the shape of a circular arc is fitted.

The snap ring 70 is fitted into the ring groove 12 to seal the open ends 11*a* of the first fitting grooves 11. Being slid to the input side, the retainer plate 30*b* comes into contact with the snap ring 70 to be received by the snap ring 70. This restricts (i.e., blocks) the movement of the retainer plate 30*b* toward the input side.

Piston 50

As shown in FIGS. 1 and 2, the piston 50, which slides in the axial direction, is located deepest in the drum 10, that is, on the output side of the plate housing chamber 60. The piston 50 according to the present embodiment is integrally formed of a press 50*a* and a mover 50*b*, for example.

The press 50*a* is located in the plate housing chamber 60 and closer to the output side than the spring plate 80 and the plate group are. The press 50*a* faces the spring plate 80 in the axial direction. On the other hand, the mover 50*b* is located inside the hub 20. At the output side of the mover 50*b*, a hydraulic chamber 52 is located. The hydraulic chamber 52 is liquid-tightly partitioned by the mover 50*b*.

The mover 50*b* is biased toward the output side once the press 50*a* receives the spring plate 80 applied with the elastic force of the springs 90. As necessary, pressure oil is supplied or discharged from a hydraulic pump (not shown) to the hydraulic chamber 52. Accordingly, the hydraulic pressure acts on the mover 50*b* to move the mover 50*b* in the axial direction.

Specifically, once the pressure oil is supplied to the hydraulic chamber 52, the mover 50*b* slides toward the input side against the elastic force of the springs 90. Once the pressure oil is discharged from the hydraulic chamber 52, the mover 50*b* is slid toward the output side by the elastic force of the springs 90. The mover 50*b* slid to the output side is received by the bottom wall 10*b* of the drum 10. This restricts (i.e., blocks) the movement of the mover 50*b*.

With this hydraulically controlled movement of the mover 50*b*, the press 50*a* moves in the plate housing chamber 60 forward and rearward from the output side toward the plate group.

Operation of Friction Engaging Device 6

In order to perform switching between the connection and the disconnection between the hub 20 and the drum 10, the brake 6 is switched by hydraulic control.

Figure 4:
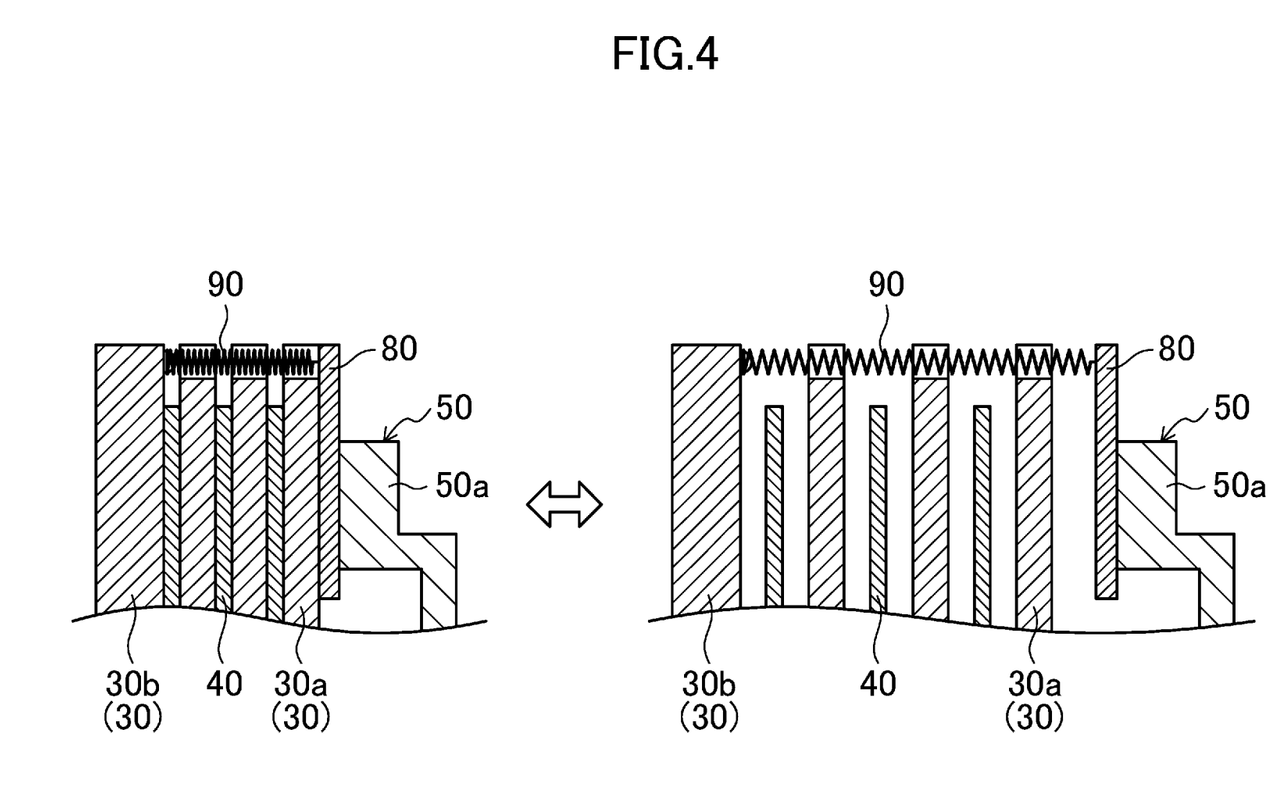
FIG. 4 is a schematic diagram illustrating an operation of the friction engaging device.

Specifically, as shown in FIG. 4, the brake 6 is switched between the state (i.e., an engaged state) in which the driven plates 30 and the drive plates 40 are in close contact with each other, and the state (i.e., a disengaged state) in which the driven plates 30 and the drive plates 40 are separable from each other.

Specifically, once the pressure oil is supplied to the hydraulic chamber 52, the piston 50 (i.e., the press 50*a*) moves toward the input side as shown in the left view of FIG. 4. Accordingly, the plate group is engaged upon application of a pressing force. In the engaged state, the plate group including the retainer plate 30*b* is received by the snap ring 70 and the press 50*a* is positioned closest to the input side.

On the other hand, once the pressure oil is discharged from the hydraulic chamber 52, the piston 50 (i.e., the press 50*a*) is moved to the output side by the elastic force of the springs 90 as shown in the right view of FIG. 4. This separates the piston 50 from the plate group to release the pressing force from the plate group and make the plate group disengaged. In the disengaged state, since the press 50*a* is positioned closest to the output side, the distance between the press 50*a* and the snap ring 70 increases so that the driven plates 30 including the retainer plate 30*b* and the drive plates 40 are free (slidable in the axial direction) within the increased distance.

Since the driven plates 30 and drive plates 40 in the disengaged state are applied with no pressing force and slidable in the axial direction, no frictional force should act among these plates. In the wet brake 6, however, the ATF is supplied among the plates. Its fluid friction may thus cause frictional resistance and eventually a torque loss (i.e., a drag phenomenon).

Specifically, while the hub 20 rotates in the disengaged state, the centrifugal force acts on the ATF introduced from the hub 20 into the plate housing chamber 60 to promote the flow of the ATF from the inside to the outside in the radial direction.

Since the ATF is usually supplied to the plate housing chamber 60 at a constant flow rate, the centrifugal force increases the flow rate with an increase in the rotational speed of the hub 20. The amount of the ATF discharged from the plate housing chamber 60 then exceeds the amount of the supplied ATF. In this state, there is a difference in the radial pressure between the surfaces of the adjacent pairs of the driven plates 30 and the drive plates 40 (also simply referred to as "plate surfaces") to cause a negative pressure between the plate surfaces.

Figure 5:
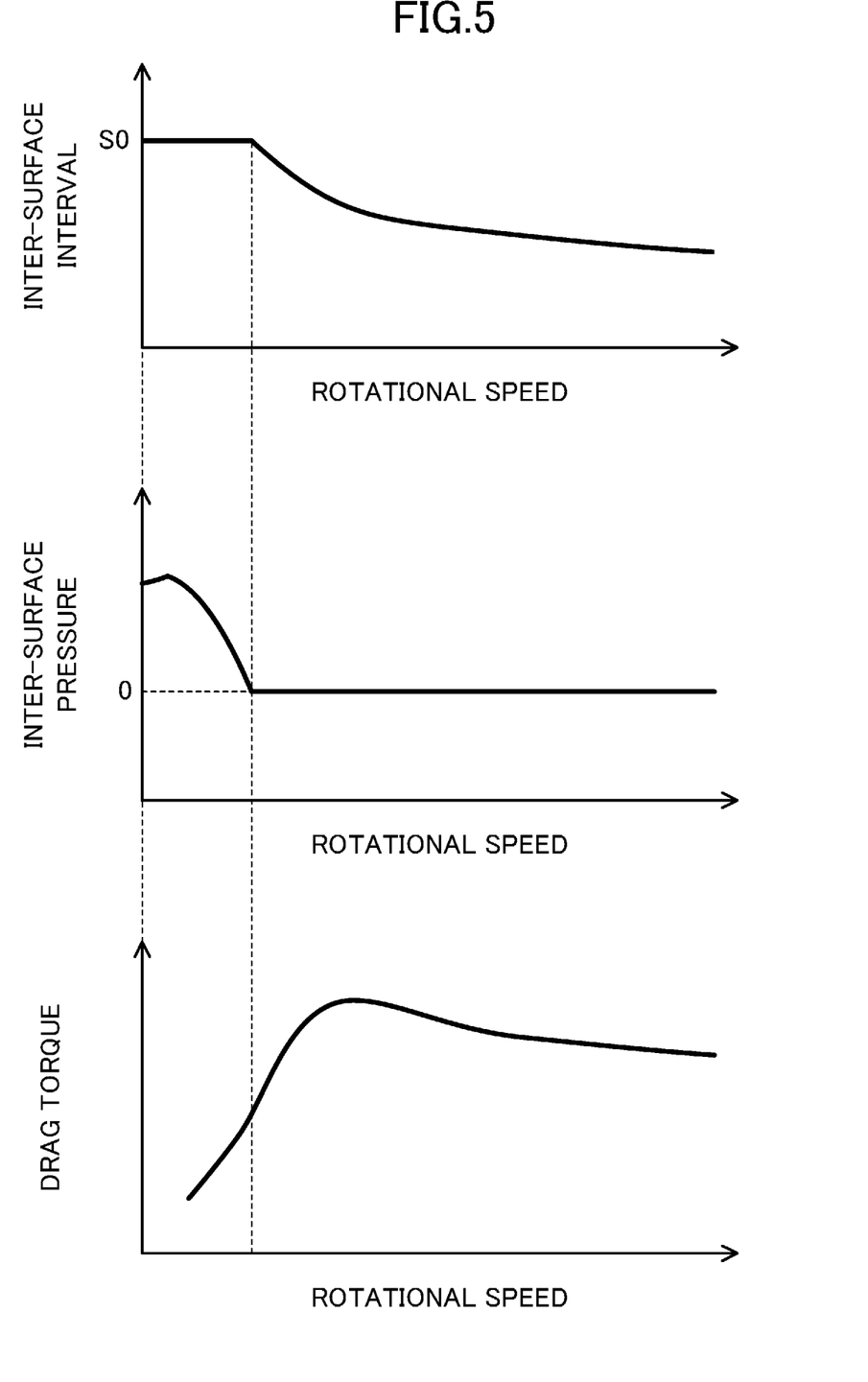
FIG. 5 provides graphs representing the relationships between (i) the rotational speed of a hub and (ii) an inter-surface interval, an inter-surface pressure, and a drag torque.

FIG. 5 provides exemplary graphs representing the relationships between (i) the rotational speed of the hub 20 and (ii) an inter-surface interval (i.e., the interval between the plate surfaces), an inter-surface pressure (i.e., the pressure between the plate surfaces), and the generated drag torque, obtained by a simulation. S0 denotes the inter-surface interval (also referred to as a "proper inter-surface interval S0") where the driven plates 30 and the drive plates 40 are equally spaced from each other, that is, arranged at an equal interval in the disengaged state.

At a low rotational speed, a smaller centrifugal force acts on the ATF so that the amount of supplied ATF is larger than the amount of discharged ATF. Accordingly, the inter-surface pressure increases (i.e., a positive pressure), and the inter-surface interval is almost equal to the proper inter-surface interval S0. This results in a low frictional resistance and a small drag torque.

With an increase in the rotational speed, the centrifugal force also increases. Accordingly, as described above, the amount of the discharged ATF exceeds the amount of the supplied ATF to cause a negative pressure between the plate surfaces. The driven plates 30 and drive plates 40 in the disengaged state are free in the axial direction at a larger interval in the axial direction. The plates are attracted to each other by the negative pressure and the pressure balance causes an inter-surface pressure of 0 (zero), whereas the inter-surface interval decreases.

Figure 6A:
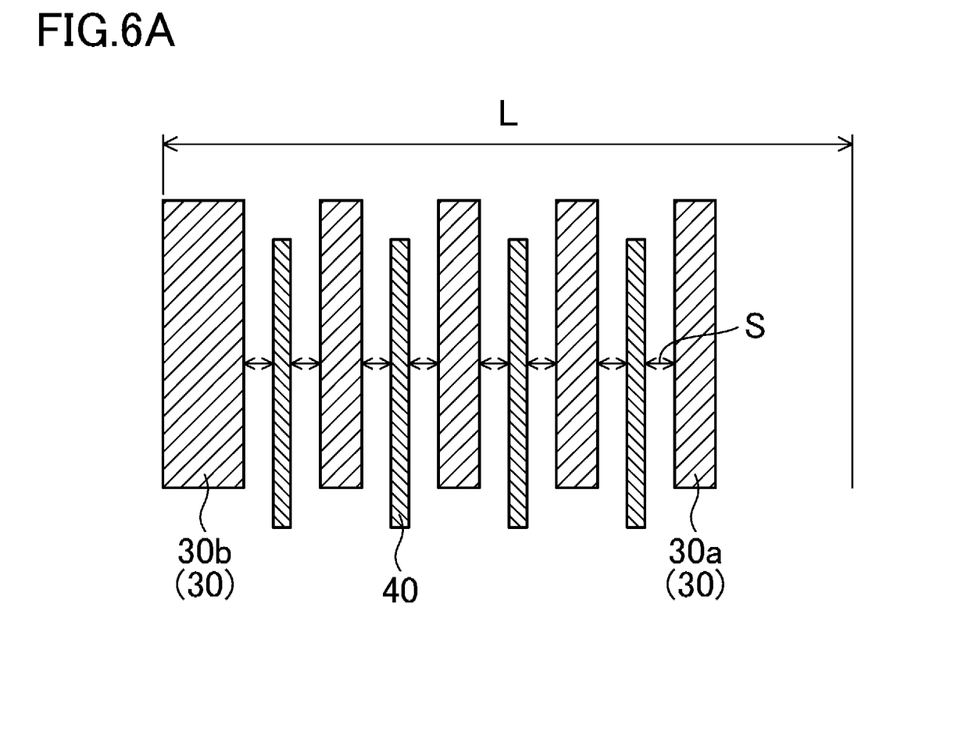
FIG. 6A illustrates the drag torque.

Specifically, as shown in FIG. 6A, the plate group actually acts as follows in the disengaged state at a high rotational speed. The driven plates 30 and the drive plates 40 are densely packed at a small interval S with respect to a movable range L in the axial direction and concentrated on the input side of the plate housing chamber 60. As a result, the drag torque increases under the influence of the fluid friction of the ATF present among the plate surfaces and remains at the high level.

Although the ideas of attaching springs, for example, between plate surfaces to increase the interval of the plate surfaces have been suggested, there are many problems such as a complicated structure. To address the problems, the present inventors found that the drag phenomenon can be effectively reduced with a very simple structure based on the mechanism of how the drag phenomenon occurs. The present disclosure is based on this finding.

APPLICATION OF PRESENT DISCLOSURE

Mechanism of Present Disclosure

As described above, being free in the axial direction, the plates in the disengaged state are attracted by the negative pressure, come close to each other, and are concentrated on the one side inside the plate housing chamber 60.

To address the problem, the present inventors found the following. The friction plates (i.e., the end plates) at respective ends of the plate group are spaced at a larger distance in the axial direction in the disengaged state than in the engaged state. Accordingly, even if a negative pressure occurs between the plate surfaces, the pressure balance naturally maintains the inter-surface interval almost at the proper inter-surface interval S0.

Figure 6B:
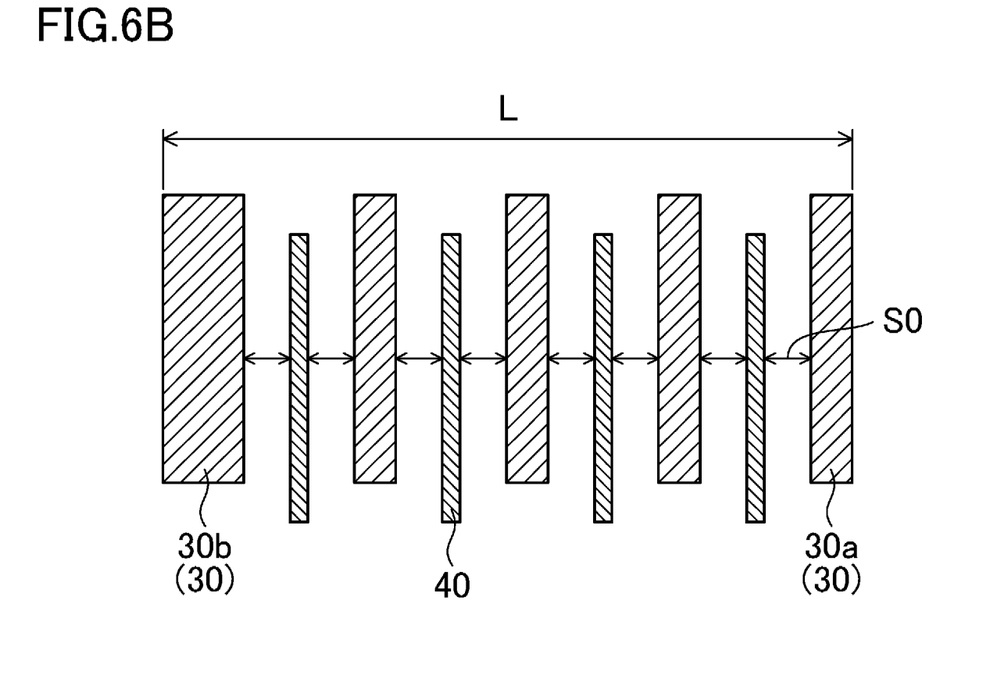
FIG. 6B illustrates a mechanism of the present disclosure.

Specifically, as shown in FIG. 6B, the end plates are spaced at a predetermined distance or more in the axial direction to provide a sufficient interval between the plate surfaces after the switch to the disengaged state. With this configuration, even if a negative pressure occurs between the plate surfaces, the inter-surface interval is naturally adjusted so that the pressure between the plate surfaces becomes equal to each other. The plates are then balanced at a substantially equal interval. As a result, the inter-surface interval is maintained almost at the proper inter-surface interval S0.

Figure 7:
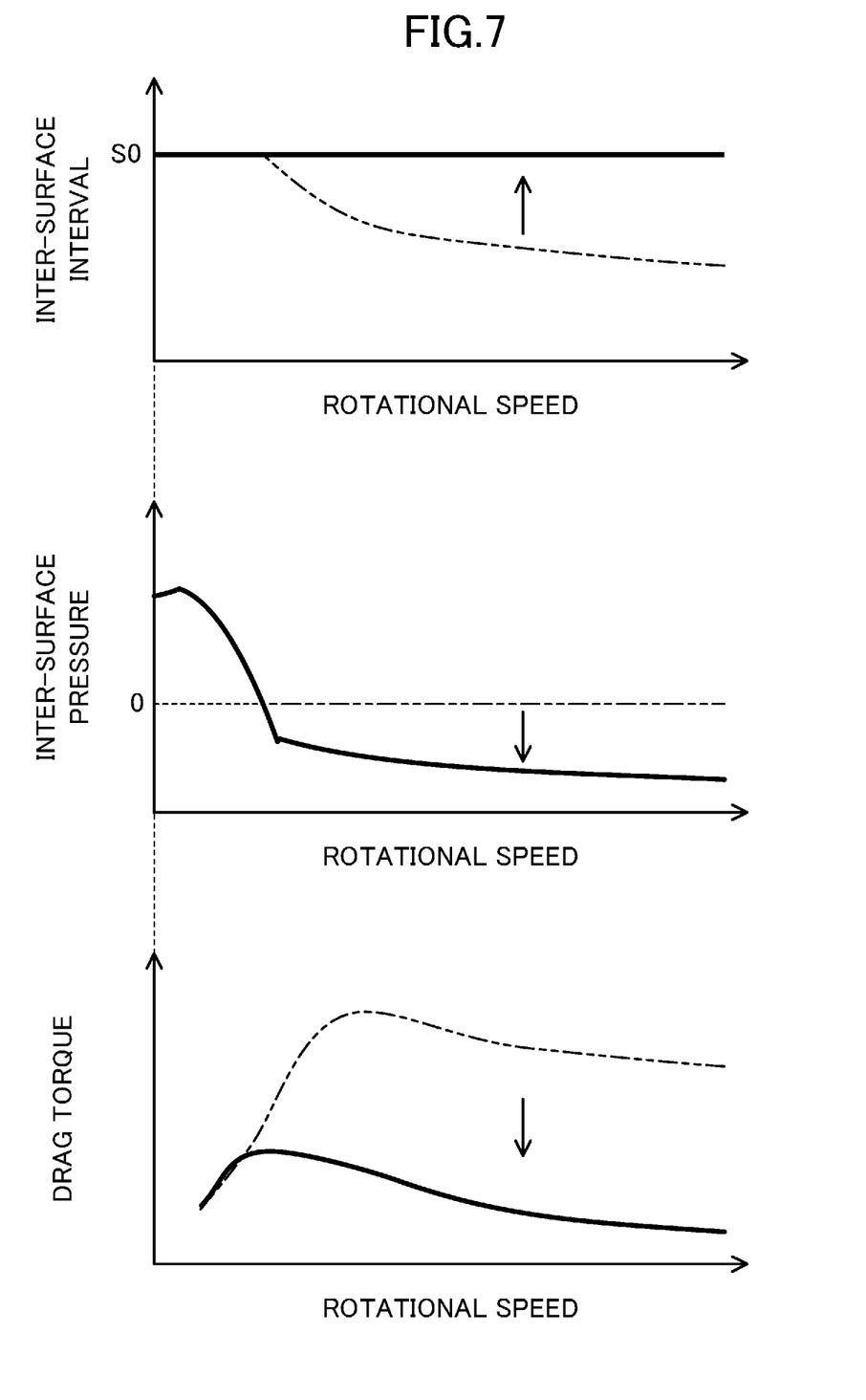
FIG. 7 provides graphs in application of the present disclosure, corresponding to FIG. 5.

FIG. 7 provides exemplary graphs based on a simulation where the end plates are kept in predetermined positions in a disengaged state, corresponding to FIG. 5. As shown in FIG. 7, with an increase in the rotational speed, adjacent pairs of the driven plates 30 and the drive plates 40 are attracted to each other by the negative pressure. This causes a negative inter-surface pressure.

On the other hand, it was confirmed that the inter-surface interval was almost unchanged and maintained at the proper inter-surface interval S0 and that the drag torque largely decreased. Therefore, the end plates in the disengaged state are spaced at a predetermined distance to maintain the inter-surface interval at the proper inter-surface interval S0. This configuration effectively reduces the drag phenomenon.

DETAILED DESCRIPTION OF THE DISCLOSURE

Figure 8:
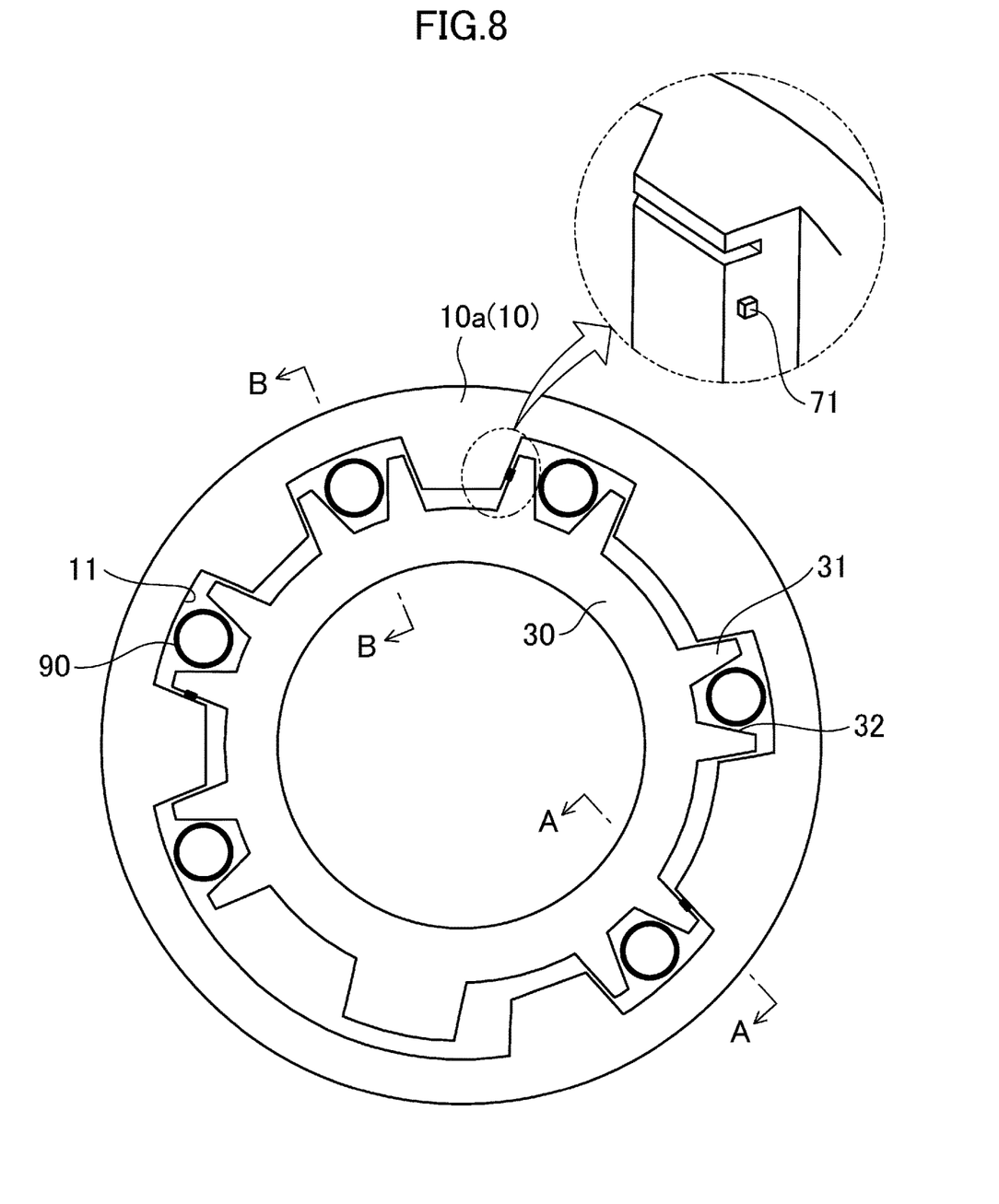
FIG. 8 is a schematic diagram showing a specific example of a friction engaging device employing the present disclosure.
Figure 9A:
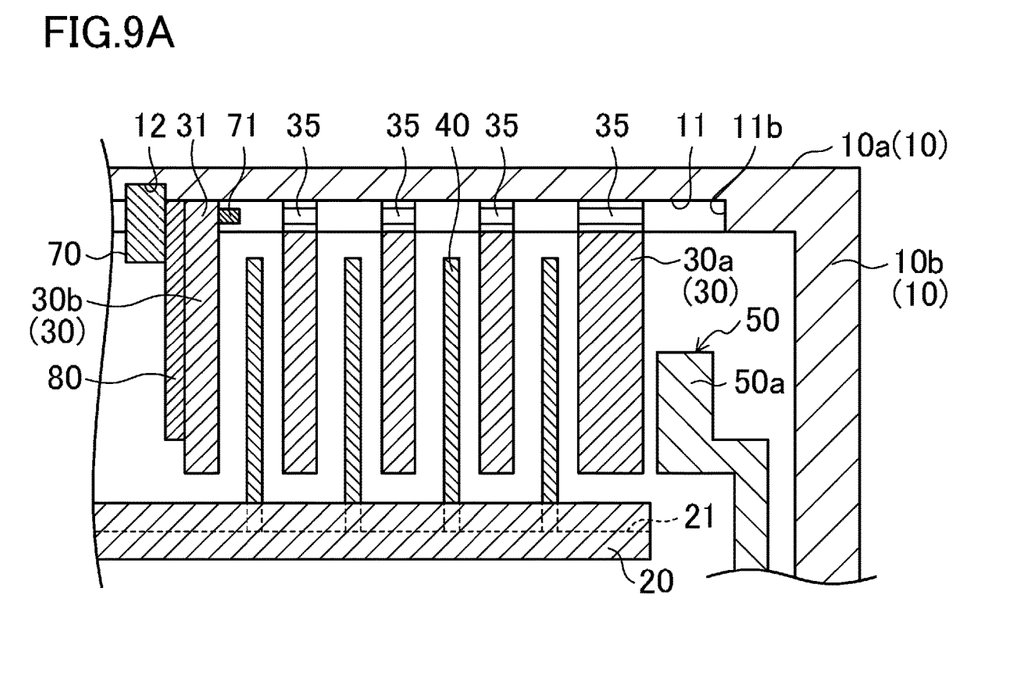
FIG. 9A is a schematic cross-sectional view taken along the arrow A-A of FIG. 8.
Figure 9B:
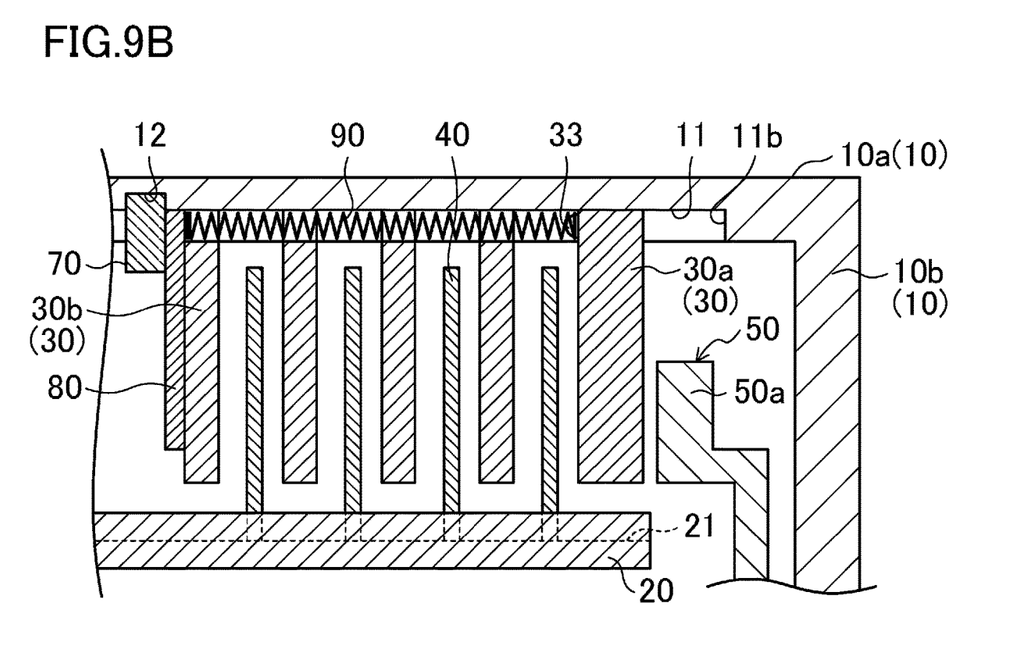
FIG. 9B is a schematic cross-sectional view taken along the arrow B-B of FIG. 8.

FIGS. 8, 9A, and 9B show a specific example of the brake (also referred to as an "improved brake") 6 included in the transmission 1 described above and employing the present disclosure. FIGS. 9A and 9B are cross-sectional views of the main part of FIG. 8.

In this improved brake 6, one of the end plates on the respective sides of the plate group is a movable end plate movable in the axial direction, and the other is a stationary end plate immovable in the axial direction. The movable end plate is biased by the springs 90 to be separated from the stationary end plate in the axial direction.

Specifically, as compared to the brake 6 described above, the arrangements of the spring plate 80 and the retainer plate 30b are replaced so that the retainer plate 30b is positioned on the output side and the spring plate 80 on the input side. The retainer plate 30b serves as the movable end plate, whereas the spring plate 80 and the input-side end plate 30b serve as the stationary end plate.

That is, in this improved brake 6, the retainer plate with a larger thickness than the other driven plates 30 serves not as the input-side end plate 30b but the output-side end plate 30a (also referred to as a "retainer plate 30a"). As necessary, however, the retainer plate 30a may have a smaller thickness, whereas the input-side end plate 30b may have a larger thickness. The thicknesses may be modified in accordance with the specifications.

Stationary End Plate

The stationary end plate is obtained by stacking the spring plate 80 on and outside the input-side end plate 30b on the side away from the piston 50, that is, on the input side, and allowing the snap ring (first movement regulator) 70 at one side of these plates and stoppers (second movement regulators) 71 at the other side to restrict the axial movement.

Specifically, as shown in an enlarged view in FIG. 8 or schematically shown in FIG. 9A, each first fitting groove 11 has, on its inner wall surface near the open end, a small protrusion (i.e., the stopper 71) protruding inward. The stopper 71 is located closer to the output side than the associated ring groove 12 is, to leave a gap slightly larger than the sum of the thicknesses of the input-side end plate 30b and the spring plate 80 between the stopper 71 and the ring groove 12.

Figure 10A:
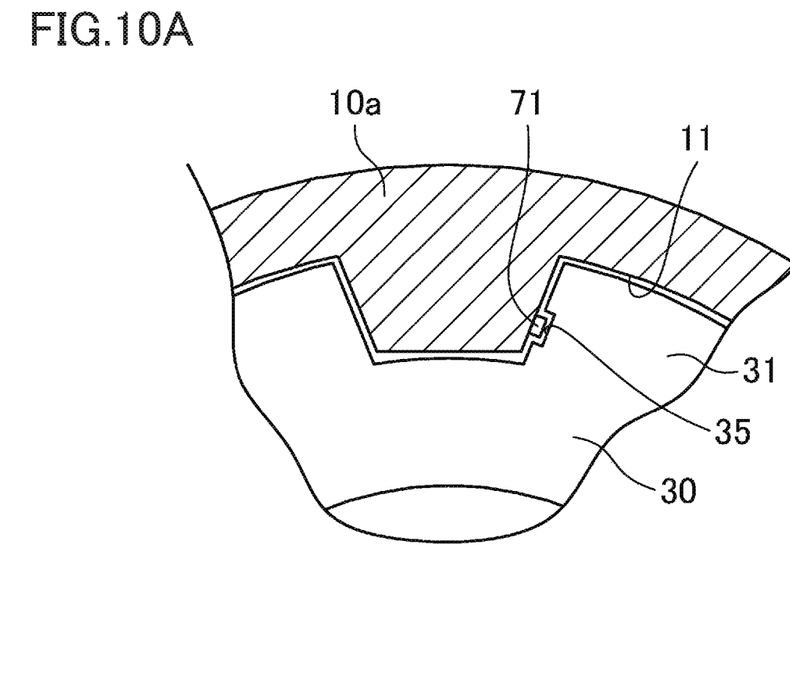
FIGS. 10A and 10B illustrate a configuration of a stationary end plate.

In addition, as shown in FIG. 10A, each of the driven plates 30 including the retainer plate 30a but excluding the input-side end plate 30b has cut-outs 35 in the first fitting pieces 31 to be fitted into the first fitting grooves 11 with the stoppers 71 to prevent or reduce the contact with the stoppers 71.

In the improved brake 6, the driven plates 30 including the retainer plate 30a are assembled to the drum 10 as follows. While the driven plates 30 and the drive plate 40 are arranged alternately, the first fitting pieces 31 are fitted into the first fitting grooves 11 to be attached to the drum 10. At this time, the driven plates 30 can be attached to the drum 10 without any problem, even if the first fitting grooves 11 have the stoppers 71, since the driven plates 30 have the cut-outs 35.

Figure 10B:
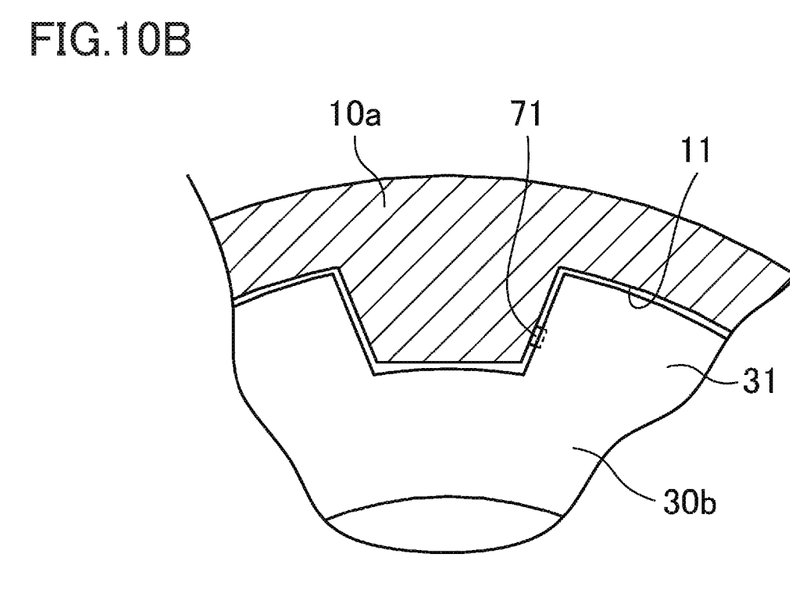

On the other hand, as shown in FIG. 10B, the input-end plate 30b, whose first fitting pieces 31 are last fitted into the first fitting grooves 11, has no cut-outs 35. Accordingly, the slide of the input-side end plate 30b toward the output side is restricted by the stoppers 71. That is, the stoppers 71 restrict the movement of the input-side end plate 30b toward the output side.

The spring plate 80 is then arranged in close contact with and outside the input-side plate 30b, whose movement to the output side is restricted, in the axial direction. After that, the snap ring 70 is fitted into the ring groove 12. The snap ring 70 restricts the movement of the input-side end plate 30b and the spring plate 80 to the input side. As a result, since the axial movement is restricted, the input-side end plate 30b and the spring plate 80 serve as the stationary end plate.

Movable End Plate

The movable end plate is the retainer plate 30a. The retainer plate 30a is biased by the springs 90, which are attached between the spring plate 80 and the retainer plate 30a, to be spaced apart from the spring plate 80.

As shown in FIG. 9B, one ends of the springs 90 are fixed to the spring plate 80 like in the configuration described above, whereas the other ends are supported by the spring holders 33 of the retainer plate 30a. The springs 90 are compressed to be housed in the plate housing chamber 60. This configuration prevents or reduces come-off of the springs 90.

Since the movement of the spring plate 80 is restricted, forward and backward movement of the piston 50 allows the elastic force of the springs 90 to move the retainer plate 30a in the axial direction. With this configuration, once the brake is switched to the disengaged state, the elastic force of the springs 90 increases the distance between the retainer plate 30a and the input-side end plate 30b up to the limit in the axial direction.

As a result, the retainer plate 30a and the input-side end plate 30b are kept at a predetermined distance. This sets thus the inter-surface interval to the proper inter-surface interval S0.

Although not shown in the figure, the spring plate 80 may have spring holders 33 to detachably support the springs 90. There is only need to prevent or reduce the come-off of the springs 90.

In one preferred embodiment, the springs 90 are arranged in three or more positions at a predetermined interval in the circumferential direction. In this specific example, the springs 90 are arranged in six positions.

In order to provide a uniform inter-surface pressure in the disengaged sate, the two end plates are kept in parallel in one preferred embodiment. For the purpose, there is a need to apply the elastic force of the springs 90 in a well-balanced manner in the circumferential direction.

The arrangement of three or more springs 90 at an interval in the circumferential direction stably keeps the two end plates in proper postures.

In addition, the springs 90 are located at the outer circumferences in the radial direction in one preferred embodiment. The springs 90 according to this specific example are located outside the outer circumferential edges of the driven plates 30 and the drive plates 40 arranged between the end plates.

As compared to the springs at the centers, the springs at on the outer circumferences efficiently apply the elastic force in a well-balanced manner and stably keep the two end plates in proper postures.

The friction engaging device according to the present disclosure is not limited to the embodiments and also includes various other configurations. For example, the type of the transmission employing the present disclosure is not limited to the transmission 1 described above. As long as including a wet friction engaging device, the transmission may be used not only in a motor vehicle but also for any other purpose.

The invention claimed is:

1. A wet friction engaging device for switching transmission of power to be output to a rotary shaft, the device comprising:
    two connecting members, each having a surface facing a surface of the other connecting member in a radial direction with a plate housing chamber interposed therebetween, the chamber being supplied with lubricating oil;
    a plate group engaged with the connecting members and including two groups of friction plates housed in the plate housing chamber and alternately arranged in an axial direction with surfaces facing each other; and
    a piston moving between an input side and an output side in the axial direction toward the plate group to apply a pressing force to the plate group, wherein
    the plate group is switched between an engaged state in which the friction plates are in close contact with each other upon application of the pressing force and a disengaged state in which the friction plates are separable from each other upon release of the pressing force,
    one of end plates at respective ends of the plate group is a movable end plate movable in the axial direction, and the other is a stationary end plate immovable in the axial direction,
    the movable end plate is biased by a biasing member to be separated from the stationary end plate in the axial direction,
    the movable end plate is the end plate on a side closer to the piston,
    the stationary end plate is positioned by stacking a regulator plate on and outside the end plate on a side away from the piston and having a first movement regulator at one side of these plates and a second movement regulator at the other side to restrict axial movement, and
    the biasing member is a spring, which is attached between the movable end plate and the regulator plate.

2. The friction engaging device of claim 1, wherein at least one end of the spring is fixed to one of the end plates.

3. The friction engaging device of claim 2, wherein the spring includes a plurality of springs in three or more positions at a predetermined interval in a circumferential direction.

4. The friction engaging device of claim 3, wherein the springs are located outside outer circumferential edges of the friction plates arranged between the end plates.

5. The friction engaging device of claim 1, wherein at least one end of the spring is detachably supported by a spring holder located at one of the end plates.

6. The friction engaging device of claim 5, wherein the spring includes a plurality of springs in three or more positions at a predetermined interval in a circumferential direction.

7. The friction engaging device of claim 6, wherein the springs are located outside outer circumferential edges of the friction plates arranged between the end plates.

8. The friction engaging device of claim 1, wherein the spring includes a plurality of springs in three or more positions at a predetermined interval in a circumferential direction.

9. The friction engaging device of claim 8, wherein the springs are located outside outer circumferential edges of the friction plates arranged between the end plates.

* * * * *